United States Patent [19]

Sakakino

[11] Patent Number: 4,607,160
[45] Date of Patent: Aug. 19, 1986

[54] NON-CONTACT SWITCHING DEVICE

[75] Inventor: Takahiro Sakakino, Nagaokakyo, Japan

[73] Assignee: Omron Tateisi Electronics Co., Kyoto, Japan

[21] Appl. No.: 534,099

[22] Filed: Sep. 20, 1983

[30] Foreign Application Priority Data

Sep. 21, 1982 [JP] Japan .............................. 57-143672[U]
Sep. 21, 1982 [JP] Japan .............................. 57-143673[U]
Sep. 21, 1982 [JP] Japan .................................. 57-165298

[51] Int. Cl.[4] .............................................. G02B 5/14
[52] U.S. Cl. ...................................... 250/227; 250/229
[58] Field of Search ....................... 250/227, 229, 551; 350/266, 286, 96.19, 96.15

[56] References Cited

U.S. PATENT DOCUMENTS 3,123,066  3/1964  Brumley .................................. 356/41
4,170,731 10/1979  Howell et al. ......................... 250/227
4,223,217  9/1980  Bongard et al. ....................... 250/227
4,315,147  2/1982  Harmer .................................. 250/227

Primary Examiner—David C. Nelms
Assistant Examiner—J. Gatto
Attorney, Agent, or Firm—Wegner & Bretschneider

[57] ABSTRACT

A non-contact switching device comprising a housing, a light path switching member housed within the housing, an actuator member disposed in the housing for transferring an external mechanical force to the light path switching member, a light entrance member disposed on the housing connectable to a first optical fiber for guiding light transferred from an external light source through the first optical fiber to the light path switching member, and a light exit member disposed on the housing connectable to a second optical fiber for guiding light from the light path switching member to the second optical fiber, the light path switching member being associated with the actuator member so as to switch a light path from the light entrance member to the light exit member through the light path switching member.

4 Claims, 14 Drawing Figures

NON-CONTACT SWITCHING DEVICE

BRIEF SUMMARY OF THE INVENTION

This invention relates to a non-contact switching device, and more particularly to an improved non-contact switching device employing an optical fiber.

There is well known non-contact switching device which employs a Hall element cooperated with a magnet or an electronic photo-couplar as a sensing member of the device so as to avoid the disadvantages developed in a mechanical contact switch. The well-known device, however, has the disadvantage that it is easy to be adversely affected by external conditions.

It is, therefore, a primary object of this invention to provide a non-contact switching device employing an optical fiber which may be applied to a remote control system without decreasing any switching reliability thereof by external condition.

It is a further object of this invention to provide a non-contact switching device with a perfect waterproof or sealing.

Other objects as well as numerous advantages of the non-contact switching device according to this invention will become apparent from the following detailed description and the accompanying drawings, in which:

DETAILED DESCRIPTION

Figure 1:
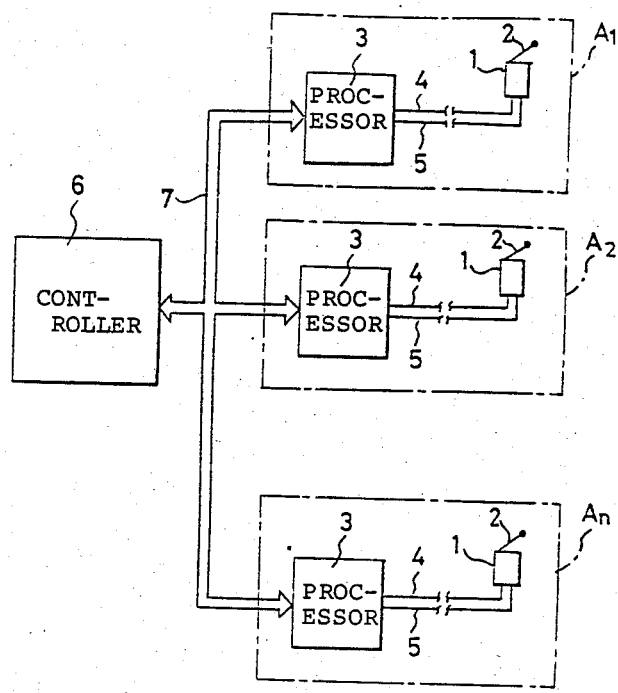
FIG. 1 is a schematic block diagram of a remote control system employing a non-contact switching device as a preferred embodiment of this invention.

Referring, now, to FIG. 1, there is shown a remote control system in which non-contact switching devices $A_1$ to $A_n$ are employed as a preferred embodiment of this invention.

Each of the non-contact switching devices $A_1$ to $A_n$ includes a sensing unit 1 having a actuator 2, a signal processor 3 for producing a switching signal cooperating with the unit 1, and light projecting and receiving optical fibers 4 and 5 connected between the unit 1 and the processor 3. The respective devices $A_1$ to $A_n$ are connected through data bus 7 to a controller 6, e.g. programmable controller, which controls or processes signals from or to the respective devices $A_1$ to $A_n$.

Figure 2:
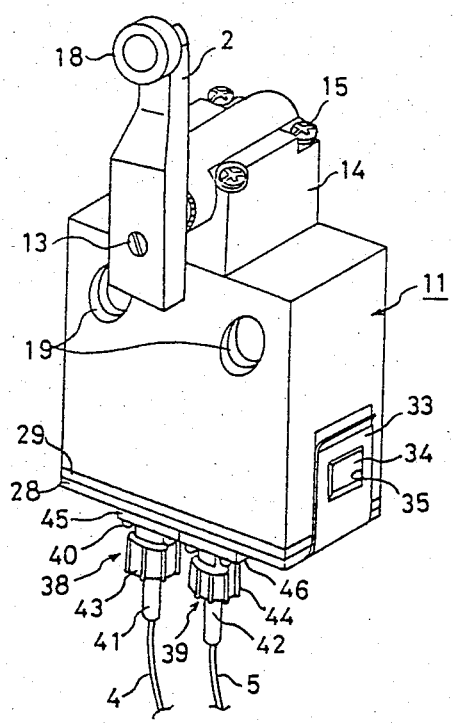
FIG. 2 is a perspective view of a sensing unit of the non-contact switching device of FIG. 1.
Figure 4:
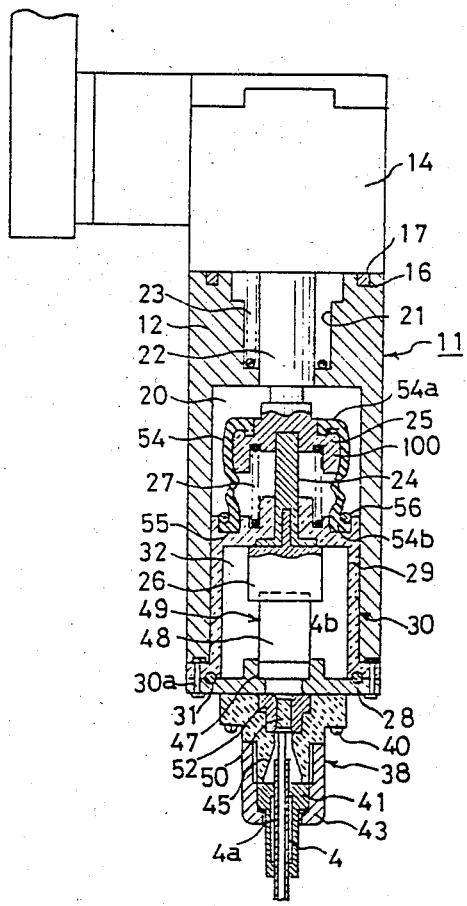
FIG. 4 is a side sectional view of the unit of FIG. 2.
Figure 3:
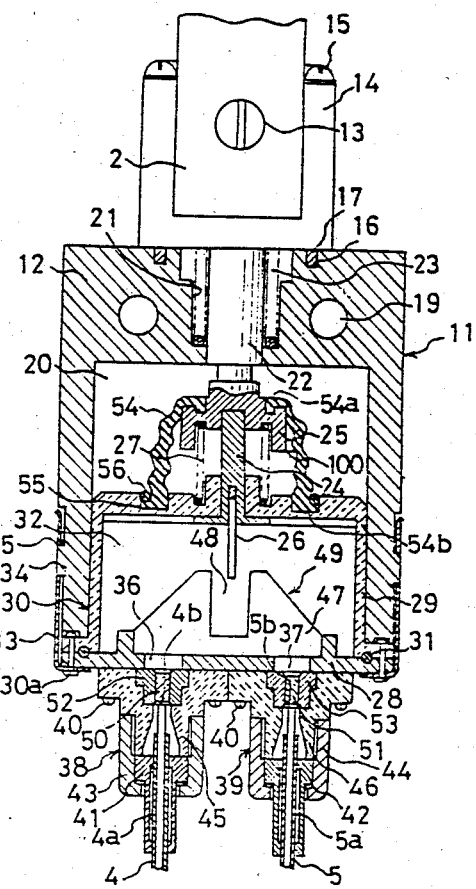
FIG. 3 is a front sectional view of the unit of FIG. 2.

The sensing unit 1 is illustrated in FIGS. 2, 3 and 4. The unit 1 includes a housing 11 on an upper wall 12 of which a shaft 13 fixed to a bottom end of the above-mentioned actuator 2 is rotatably supported by a head member 14. The head member 14 houses a cam mechanism (not shown in drawings) therewithin which transfers a rotary movement by the actuator 2 into a vertical movement applied to a plunger 22. The plunger 22 is supported by an extending through hole 21 for a vertical movement, and is biassed upward by a coil spring 23. To a lower end of the plunger 22, there is fixed a rod 24 through a holder 25. An opaque shutter 26 made of metal or the like is fixed to a lower end of the rod 24. The holder 25 is biassed by a reset spring 27, and removably fixed to the plunger 22.

Figure 5:
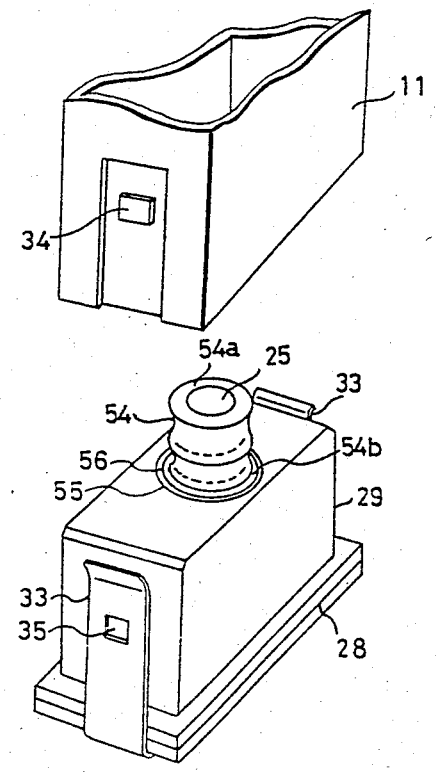
FIG. 5 is a partially disassembled perspective view of the unit of FIG. 2 for illustrating a housing construction thereof.

The housing 11 is removably inserted by an inner housing 30 having a cover 29 and a base 28 which houses a light path switching member 49 within the same. An O-ring 31 is inserted between the base 28 and the cover 29 so that a chamber 32 is completely sealed. The shutter 26, the rod 24 and the holder 25 constitute with the cover 29 a unit as illustrated in FIG. 5. A pair of resilient blades 33 are disposed on both sides of the inner housing 30 so that the housing 30 is removably engaged with the housing 11 by the blades 33 having their holes 35 engaged with projections 34 formed on the housing 11.

The base 28 is provided with a pair of transparent apertures 36 and 37, on which a pair of optical fiber connectors 38 and 39 are mounted by screws 40 so as to correspond to the apertures 36 and 37, respectively. The respective ends 4a and 5a of the above-mentioned fibers 4 and 5 are fixed by the connectors with their cover layer removed, and their end walls 4b and 5b are processed with mirror polishing. A pair of sleeves 41 and 42 are supported by caps 43 and 44 of the connectors 38 and 39 so that the ends 4a and 5a of the fibers are fixed with respect to their positions extending through the sleeves 41 and 42 and connected to the respective predetermined fixing portions 45 and 46 of the connectors 38 and 39 by tightening the caps 43 and 44.

A generally mountain-shaped prism 47 is mounted on the base 28 acrossing the apertures 36 and 37, and is provided with a groove 48 on a top portion of the prism so as to be engaged with the shutter 26. Thus, the shutter 26 and the prism 47 constitute the light path switching member 49 for switching light from the light projecting fiber 4 to the light receiving fiber 5. A pair of distributed index lenses (called as SELFOC lens) 50 and 51 are disposed in the portions 45 and 46 of the connectors 38 and 39 so as to refract any entered light rays to parallel rays. The lenses 50 and 51 are fixed by spacers 52 and 53.

A resilient member 54 made of rubber or the like is formed in a shape of a diaphragm or the like. The member 54 is at an upper opening 54a thereof engaged with the holder 25 and at a lower opening 54b thereof engaged with a ring-shaped groove 55 of the cover 29 so that a spacing between the holder 25 and the cover 29 is sealed as illustrated in FIGS. 5 and 3.

Figure 7:
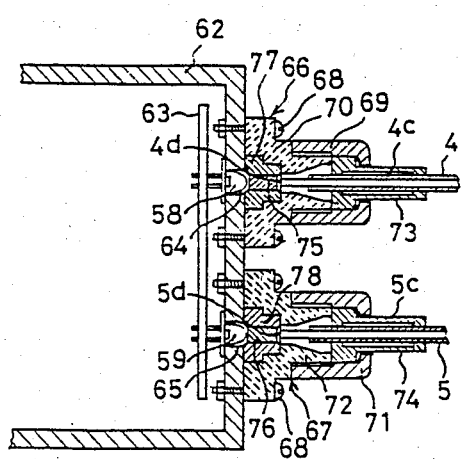
FIG. 7 is a sectional view of a part of control box accommodating the unit of FIG. 6.
Figure 6:
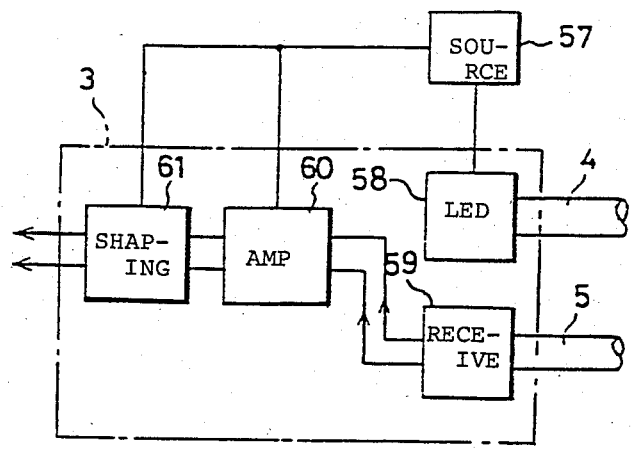
FIG. 6 is a schematic block diagram of a signal processing unit of the non-contact switching device of FIG. 1.

In FIG. 6 there is shown the signal processor 3 connected with a power source 57. The processor 3 includes a light source 58, e.g. LED or the like which projects light to the fiber 4, and a light receiving element 59, e.g. a photo-diode or the like, which receives light from the fiber 5. The receiving element 59 is connected through an amplifier 50 to a wave form shaping circuit 61 so as to generate a switching signal from the processor 3. The source 58 and the element 59 are mounted on a circuit board 63 housed within a controller box 62 as illustrated in FIG. 7. In similar construction to that of the unit of FIG. 3, the source 58 and the element 59 are optically connected to the fibers 4 and 5 by connectors 66 and 67 through a pair of distributed index lenses 75 and 76.

Figure 9:
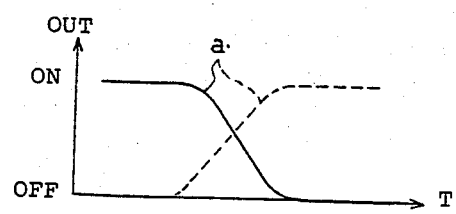
FIG. 9 shows a wave form of an output signal generated from a light receiving element employed in the unit of FIG. 6.
Figure 8:
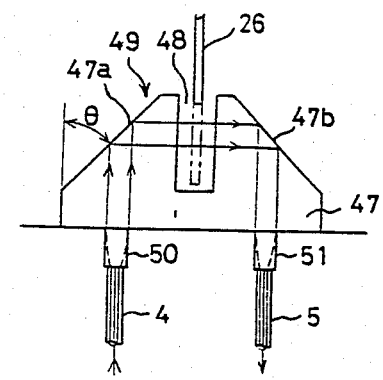
FIG. 8 is a schematic view of a light path switching member employed in the unit of FIG. 3.

The operations in the non-contact switching device of this embodiment will be described hereinafter.

Where the actuator 2 is in a normal position, the light emitted from the source 58 through the fiber 4 enters the prism 47 through the lens 50. Though the emitted light expands near a border of the lens 50 by an opening angle corresponding to an intrinsic open number of the fiber 4, the lens 50 is designed to have $\lambda/4$ ($\lambda$=wave length) so that the emitted light enters the prism 47 as parallel direction rays. As illustrated in FIG. 8, the entered light to the prism 47 is reflected by a slant surface 47a at $\theta=45°$ and further reflected by a slant surface 47 so as to enter the fiber 5. Thus, the emitted light from the source 58 is applied to the element 59, so that an output signal from the receiving element 59 is ON and applied to the amplifier 60 so as to be shaped by the circuit 61.

Where the actuator 2 is actuated by an external force, the plunger 22 moves to a lower position by the cam mechanism so that the shutter 26 enters within the groove 48 of the prism 47. Then, the light path between fibers 4 and 5 is blocked, and the output from the element 59 is OFF. Thus, the receiving element 59 generates an output illustrated by a solid line curve "a" in FIG. 9. Though the curve has a slow curve portion between ON and OFF positions as time elapses corresponding to the actuation to the actuator 2, the slow curve is shaped by the circuit 61 so as to be a digital wave-form.

Since the light path between the fibers 4 and 5 is opened or closed by the shutter 26, a predetermined electrical switching signal is performed without any mechanical contact. The sensing unit 1 is separated from the electronic circuit unit 3, so that this non-contact switching device is easy to be applied to a remote control system without any inconvenience. The fibers 4 and 5 between units 1 and 3 are free from any external noise independently of the length thereof, so that sound switching operations are ensured.

This switching device performs switching operations without moving the optical fibers 4 and 5 nor the prism 47, so that it can provide precise and reliable switching operations.

The cover 29 prevents the light path switching member 49 from any foreign matter, e.g. lubrication oil, intruding through the plunger hole 21 within the cover 29 by the actuation of the actuator 2. The resilient member 54 further ensures the sealing of the cover 29. As illustrated in FIG. 5, the inner unit housing the prism 47 is removable from the housing 11, so that even if the light path switching member 49 is faulted, the inner unit has only to be replaced. That is, maintenance work for this switching device is simplified.

Figure 10:
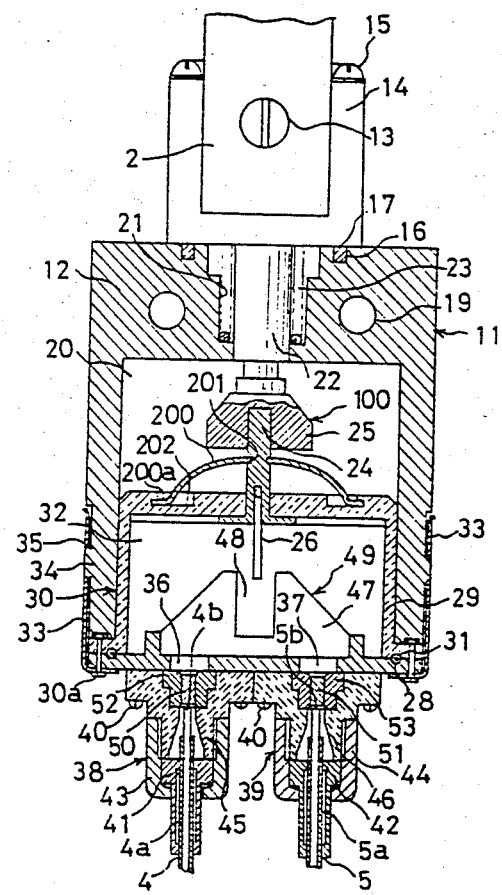
FIG. 10 is a front sectional view of a sensing unit of a non-contact switching device as another embodiment of this invention.
Figure 11:
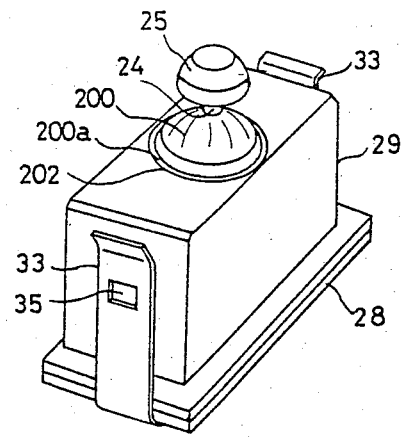
FIG. 11 is a perspective view of a lower member of the unit of FIG. 10.

In FIGS. 10 and 11 there is shown a sensing unit of a non-contact switching device as another embodiment of this invention. As a sealing member for the light path switching member 49, a resilient metal dome-shaped plate 200 is employed instead of the member 54 of FIG. 3 which is engaged with the rod 24 and the cover 29 so as to provide a snap action to the movement of the shutter 26 without a reset spring like the spring 27 of FIG. 3. The snap action improves the switching characteristics of the switching device by shortening a rise time of a light signal.

Figures 12, 13, 14:
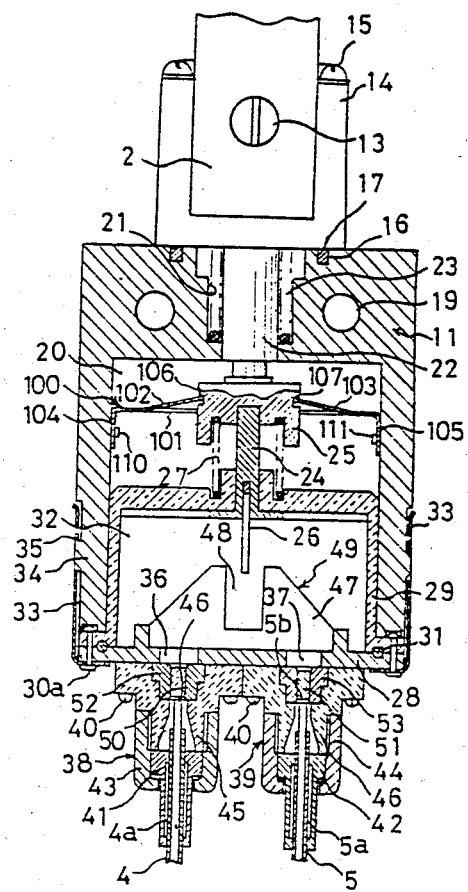
FIG. 12 is a front sectional view of a sensing unit of a non-contact switching device as still another embodiment of this invention.
FIG. 13 is a perspective view of a leaf spring employed in the unit of FIG. 12.
FIG. 14 is a schematic view of a light path switching member employed in the unit of FIG. 3 as a modification of this invention.

FIG. 12 shows still another embodiment of this invention. In order to provide the shutter 26 with a snap action, a resilient plate 100 illustrated in FIG. 13 is supported by projections 110 and 111 and engaged through movable blades 102 and with the holder 25 biassed by reset spring 27. If the snap action is not necessary, the resilient blade 100 may be omitted.

The prism 47 in the above-mentioned embodiments may be made of quartz glass or acryl resin. Alternatively, the prism may be constructed with a pair of prisms (470 and 471) as illustrated in FIG. 14.

It should be understood that the above description is merely illustrative of this invention and that many changes and modifications may be made by those skilled in the art without departing from the scope of the appended claims.

What is claimed is:

1. A non-contact switching device comprising a housing,
   light path switching means within the housing,
   actuator means disposed in the housing for transferring an external mechanical force to said light path switching means,
   light entrance means disposed on the housing connectable to a first optical fiber for guiding light transferred from an external light source through the first optical fiber to said light path switching means, and
   light exit means disposed on the housing connectable to a second optical fiber for guiding light from said light path switching means to the second optical fiber,
   said light path switching means being associated with said actuator means so as to switch a light path from said light entrance means to said light exit means through the light path switching means,
   said light path switching means having a single stationary piece prism member for guiding light from said light entrance means to said light exit means and having an opaque shutter member coupled to said actuator means for a vertical movement, said prism member having a spacing for insertion into the light path of said shutter member in response to an external force applied to the actuator means.

2. A non-contact switching device according to claim 1 further comprising a signal processing unit including a light source and a light receiving photo-electric transducing element, a first optical fiber connected between said light source and said light entrance means, and a second optical fiber connected between said light exit means and said light receiving photo-electric transducing element.

3. A non-contacting switching device in accordance with claim 1 further comprising an inner housing which provides a hermetically sealed protective enclosure around said light path switching means.

4. A non-contacting switching device in accordance with claim 3 further comprising a resilient seal and a rod which is enclosed by said resilient seal and which is actuated by said external force.

* * * * *